(12) United States Patent
Combe et al.

(10) Patent No.: US 10,284,385 B2
(45) Date of Patent: May 7, 2019

(54) ENVIRONMENTAL CONTROL METHOD AND APPARATUS

(71) Applicant: CENTRICA HIVE LIMITED, Windsor, Berkshire (GB)

(72) Inventors: Nicola Combe, London (GB); Nicholas Charles Leith, Windsor (GB)

(73) Assignee: CENTRICA HIVE LIMITED, Windsor, Berkshire (GB)

( * ) Notice: Subject to any disclaimer, the term of this patent is extended or adjusted under 35 U.S.C. 154(b) by 0 days.

(21) Appl. No.: 15/863,136

(22) Filed: Jan. 5, 2018

(65) Prior Publication Data

US 2018/0198637 A1 Jul. 12, 2018

(30) Foreign Application Priority Data

Jan. 6, 2017 (GB) .................................. 1700263.5

(51) Int. Cl.
*H04M 1/725* (2006.01)
*H04W 68/00* (2009.01)
(Continued)

(52) U.S. Cl.
CPC .......... *H04L 12/2818* (2013.01); *G05B 15/02* (2013.01); *H04L 12/2816* (2013.01);
(Continued)

(58) Field of Classification Search
CPC .. F24F 11/46; F24F 11/56; F24F 11/58; F24F 2110/10; H04M 1/72533
See application file for complete search history.

(56) References Cited

U.S. PATENT DOCUMENTS

2011/0231020 A1* 9/2011 Ramachandran .. G05D 23/1905
700/278
2012/0172027 A1 7/2012 Partheesh et al.
(Continued)

OTHER PUBLICATIONS

European Patent Office, Extended European Search Report for 18150112.3, date of search Mar. 15, 2018, Munich, 8 pages.
(Continued)

*Primary Examiner* — Dung Hong
(74) *Attorney, Agent, or Firm* — Tucker Ellis LLP; Michael G. Craig

(57) ABSTRACT

Described herein are techniques and systems for controlling, from a mobile device, an environmental control system including at least one appliance for influencing one or more environmental parameters at a premises. The mobile device comprising a user-interactive application for sending commands to the environmental control system. The application having a foreground state for controlling the environmental control system based on user-adjustable parameters; and a background state, in which user notifications are generated. A method can comprise: when the application is in a background state: determining the mobile device has crossed a geolocation threshold; determining an environmental parameter of the premises satisfies a condition; displaying a notification to a user, comprising an option to initiate a command to control an appliance; detecting the user has selected an option; and sending a message to effect the command to the environmental control system.

20 Claims, 6 Drawing Sheets

(51) Int. Cl.
  *G05B 15/02*  (2006.01)
  *F24F 11/56*  (2018.01)
  *H04L 12/28*  (2006.01)

(52) U.S. Cl.
  CPC .... *H04L 12/2825* (2013.01); *H04M 1/72533* (2013.01); *H04W 68/005* (2013.01); *F24F 11/56* (2018.01); *H04L 2012/285* (2013.01); *H04L 2012/2841* (2013.01)

(56) References Cited

U.S. PATENT DOCUMENTS

| | | | |
|---|---|---|---|
| 2013/0054863 A1* | 2/2013 | Imes | H04L 12/2827 710/304 |
| 2014/0045482 A1 | 2/2014 | Bisson et al. | |
| 2015/0350147 A1* | 12/2015 | Shepherd | H04L 51/24 715/752 |
| 2016/0018122 A1* | 1/2016 | Frank | H04W 4/021 700/278 |
| 2016/0320078 A1* | 11/2016 | Milder | F24F 11/30 |
| 2017/0005390 A1* | 1/2017 | Zakaria | H01Q 1/22 |
| 2017/0234562 A1* | 8/2017 | Ribbich | G05D 23/1923 700/277 |
| 2017/0323299 A1* | 11/2017 | Davis | G06Q 20/40145 |

OTHER PUBLICATIONS

United Kingdom, UK Search Report for GB1700263.5, date of search Jun. 19, 2017, South Wales.

\* cited by examiner

ENVIRONMENTAL CONTROL METHOD AND APPARATUS

FIELD OF THE INVENTION

The present invention relates to the field of environmental control. More particularly, the present invention relates to controlling, from a mobile device, an environmental control system for influencing one or more environmental parameters at a premises.

BACKGROUND TO THE INVENTION

Environmental control systems are available which can control environmental parameters. An example environmental control system is a heating ventilation and air conditioning (HVAC) system, which may comprise one or more devices which are operable to heat, ventilate and/or air condition a premises. In some cases, HVAC systems or environmental control systems may be operable to provide only heating, ventilation air conditioning or humidity control, rather than a combination. Environmental control systems may comprise environmental control devices for controlling the environmental parameters, e.g. boilers, radiators, central heating systems, air conditioning units or dehumidifiers and/or humidifiers.

It is possible to provide control commands for environmental control systems by programming a schedule into a thermostat at a premises, for example by pressing buttons or interacting with a touch screen on the thermostat. Such a schedule may comprise one or more user-programmable environmental characteristic setpoints and corresponding time periods, during which an environmental characteristic (or parameter) of the premises should be maintained above or below the setpoint. For example, a user may wish the temperature to be maintained between 18° C. and 22° C. between 7 am and 9 am each day. Alternatively, or additionally, a user may wish the humidity to be maintained below, e.g. 45% relative humidity (RH) throughout the day, except when the user is on vacation, when humidity levels may be allowed to rise to 50% RH in order to save energy. The thermostat may then provide commands to appliances such as a boiler, central heating system, air conditioning unit or (de-)humidifier based on measured or sensed environmental characteristics (such as the temperature or humidity) in order to maintain these characteristics within (or influence the variables towards) the user-determined setpoints.

Using an environmental control system with a thermostat at the premises that can be programmed by the user does not allow control to be optimised if the user's behaviour deviates from normal or expected behaviour, for example, if the user leaves or arrives home earlier than usual.

Sending a remote control message in a mobile telephone to control a device, either by text (SMS) message or a dedicated application is known.

SUMMARY OF THE INVENTION

Aspects of the invention are set out in the independent claims and preferred features are set out in the dependent claims.

There is described herein: a method of controlling, from a mobile device, an environmental control system including at least one appliance for influencing one or more environmental parameters at a premises; wherein the mobile device comprises an application for sending commands to the environmental control system, the application having at least: a foreground state for controlling the environmental control system based on a plurality of user-adjustable parameters for the one or more environmental parameters, wherein the application is arranged, using a screen of the mobile device to interact with a user, to present the user with an option to adjust one or more of the user-adjustable parameters in the foreground state; and at least one background state, wherein the application is arranged to generate user notifications in the background state; the method comprising the steps of, when the application is in a background state: determining that the mobile device has crossed a predetermined geolocation threshold; determining that an environmental parameter of the premises satisfies a condition; displaying, on a screen of the mobile device, a notification to a user, the notification comprising an option to initiate a command effecting control of at least one appliance; detecting that the user has selected the option to initiate the command; and sending to the environmental control system a message to effect the command.

By having such an application which, in a background state, can generate a notification in appropriate conditions which can be activated to send a command to an environmental control system, it is possible to achieve a greater degree of responsive control, without using the memory, system resources and battery power of a conventional remote control application. Furthermore, the notification and received input from a user can be achieved using minimal screen 'real estate' and in a reduced number of user operations/interactions with the mobile device.

Displaying the command based on a geolocation threshold and the value of an environmental parameter or condition allows the user to be presented with the option to select a command which is relevant to and tailored to their location (or at least the location of their mobile device) and the current environmental state of their premises. Therefore it is possible to present a suggested command that the user is likely to wish to enact, so that such a command can be executed simply and quickly, resulting in benefits in time and processing requirements. Such a method may be preferable to sending a command to the environmental control system automatically (e.g. in response to a determination of the geolocation and the value of an environmental parameter) because it allows user verification before executing the command. This can prevent unsuitable commands being sent to the environmental control system. Therefore energy savings (e.g. by not switching on environmental control appliances unnecessarily) and/or a reduction in control messages sent over the communications network may be achieved.

In some cases there may be multiple possible commands to be sent to the environmental control system. By presenting a plurality of options (e.g. at least two options f) to the user it is possible to allow the user to select the most appropriate command. A presented command or commands may be selected from a list of possible commands based on the location and current environmental state. Additionally or alternatively, selection of options for a command or commands to be presented may be based on previous selections by a user, in the same or similar circumstances for example, for example, based on a model of historical user behaviour. Furthermore, if more than one possible command is presented, the order of commands can be determined based on a determined prediction of the most likely selection by a user. Thus a subset or selection of possible commands can be presented or made available to a user, corresponding to the commands which are considered or estimated to be the most likely to be selected, without the user having to run the full application (e.g. without the application having to enter the foreground state, and without providing access to a full range of commands).

The command effecting control of at least one appliance may be a command to influence, or alter, the environmental parameter or an environmental characteristic associated with the environmental parameter. The command may result in the environmental control system operating devices to increase or decrease the temperature and/or humidity in one or more zones of the premises. For example, a target setpoint, or setpoint range, for one of the environmental characteristics or parameters may be altered and if the environmental characteristic is determined to be outside of the range or above/below the setpoint then one or more appropriate devices may be actuated in order to influence the environmental characteristic into the range or below/above the setpoint.

Environmental parameters or conditions may include room temperature and/or room humidity.

The step of determining that an environmental characteristic or environmental parameter of the premises satisfies a condition may be determined by the mobile device based on data received from the environmental control system and/or from a cloud server in communication with the environmental control system and the mobile device. For example, it may be determined by the application, whilst the application is running in the background.

Alternatively, the step of determining that an environmental parameter of the premises satisfies a condition may be performed at the environmental control system or at a cloud server in communication with the environmental control system and the mobile device.

In the foreground state, or mode, the application may occupy some or all of the screen of the mobile device, so that the interface of the app is visible to the user. In the background state, or mode, the application may not be visible on the screen of the mobile device, or the application interface (or a portion of the interface) may be visible behind or alongside one or more other applications that are occupying the majority of the screen of the mobile device. For example, in the background state the application may occupy 25% or less, or 50% or less of the screen area. In one background state, the application runs on the mobile device and can receive location data and process commands, however the user is not actively interacting with the application and the application may not be displayed on the mobile device. This background state may be referred to as the application running in the background.

In some embodiments, the application may have additional background states such as a suspended state and/or a terminated state. In the suspended or terminated state the application may not actually be running on the device in the background, for example the application may not be able to run code on the processor of the mobile device or actuate commands. In some cases, the application may not be able to generate notifications in the suspended and/or terminated state. In the suspended or terminated state the application may receive location data, indicating the location of the mobile device. In some cases, when in a suspended and/or terminated state the application may only receive notifications of significant changes in mobile device location. A significant change in location may be, for example, a change of at least 250 m, at least 500 m or at least 1000 m. A significant change in location may trigger a notification to the application to transfer it from a suspended and/or terminated state to a background state.

In some cases the application may be automatically transitioned from a suspended and/or terminated state to a background state in which the application is running, but remains in the background, after a predetermined time period, regardless of whether there has been a significant change in location, in order that the application can ascertain the location of the mobile device. For example, the predetermined time period may be 10 minutes, 15 minutes, 20 minutes, 30 minutes or 1 hour.

The method may be performed whilst another application on the mobile device is in a foreground state. Advantageously, the user may not be required to exit that other application and/or the other application may not need to transition into a background state. This may result in a more efficient use of available processing capacity and/or screen space, and also an improved user experience.

The step of determining that an environmental parameter satisfies a condition may comprise determining that the environmental characteristic is below or above a predetermined setpoint value or outside a predetermined range.

In some embodiments, the step of determining that an environmental parameter satisfies a condition may be performed before the step of determining that the mobile device has crossed a predetermined geolocation threshold.

In other embodiments, the step of determining that an environmental parameter of the premises satisfies a condition may be performed after the step of determining that the mobile device has crossed a predetermined geolocation threshold. This order may be preferable, because the application may be required to run code and perform certain processing (at least in the background) and/or information may need to be received from the environmental control system or a cloud server in order to determine whether the environmental parameter satisfies a condition. By performing the step of determining that the mobile device has crossed a predetermined geolocation threshold first, the application may not need to run in the background until the mobile device has crossed the required location threshold. This may reduce the processing power required. This may be advantageous particularly where one or more other applications on the mobile device also require location data, and thus the location information is being processed for multiple applications.

In some embodiments, the method is performed without the application transitioning into foreground state. For example, the application may remain in a background state, or transition from a suspended or terminated state into a background state during the method.

In some embodiments, determining that the mobile device has crossed a predetermined geolocation threshold causes a notification to be sent to the application to transition from a suspended or terminated state into a background state. The application may then remain in a background state while the remaining method steps are performed.

For example, sending to the environmental control system a message comprising the command to influence or alter the environmental condition may not require opening the application on the mobile device or displaying the application on the screen.

Preferably, detecting that the user has selected the option to initiate the command is by detection of a single user interaction (or user input) with the mobile device.

As used herein, a user interaction refers to a single input, such as a single gesture or contact with a touchscreen or a single depression of a physical button. A user interaction session may involve a sequence of user interactions, such as a series of inputs, e.g. a series of gestures or touches (e.g.

taps of press and hold gestures) on a touchscreen, or the depression of a series of buttons. In some embodiments, voice-activated inputs may be described in this way, such that a single word or short phrase (e.g. 2-10 words) may be a single user interaction, whereas a series of disconnected single words or phrases (which may e.g. be separated by options or queries presented via a user interface of the mobile device) can be described as a user interaction session. A user interaction session may comprise a series of user interactions within a predetermined time period, e.g. 10 seconds, 20 second, 30 seconds or 1 minute. Alternatively, or additionally, a user interaction session may comprise a series of user interactions separated by not more than a predetermined time period, e.g. 1 second, 3 seconds, 5 seconds, 10 seconds, 20 seconds or 1 minute, for example such that the time between the end of one interaction in the sequence and the beginning of the next interaction is not more than the predetermined time period.

By allowing a user to select a command by a single interaction, or by only two interactions with the mobile device, the processing required to receive the user's selection of the command may be reduced, which may reduce the amount of processing power required for processing the command, reduce the battery power used in processing the command, save time and provide an improved user experience.

For example, the command may be selected by a user tapping, touching or swiping an area of a touchscreen on which the option to initiate the command is displayed (where the mobile device has a touch screen). Where physical buttons are provided, the command may be initiated by pressing a button corresponding to the area of the screen on which the command is displayed.

In embodiments where the mobile device has a voice recognition module, the selection of the command may be by voice recognition, for example the user may say "yes" (for example in response to a notification which displays one command), or say the number (or another identifier, such as a letter) of the command (for example where a notification displays more than one possible command to execute).

Preferably, the method comprises no more than two user interactions. For example, the method may comprise detecting a user interaction session comprising not more than two user interactions.

In some cases, the steps of displaying, on a screen of the mobile device, a notification to a user, the notification comprising an option to initiate a command effecting control of at least one appliance; and detecting that the user has selected the option to initiate the command may comprise no more than two interactions.

Preferably, the no more than two user interactions comprises: a first optional user interaction to cause the option to initiate a command effecting control of at least one appliance to be displayed; and a second user interaction to select the option to initiate the command.

In some cases, the method comprises no more than three user interactions. For example, the method may comprise detecting a user interaction session comprising not more than two user interactions. For example, two interactions may be required to display the option for the command, and a single interaction may be required to select the option.

In some embodiments, the option to initiate a command comprises a graphical object associated with the command; and detecting that the user has selected the option to initiate the command comprises detecting that the user has selected the graphical object, preferably by a tap on the graphical object or by a press on the graphical object for more than a predetermined time.

Optionally the option to initiate a command effecting control of at least one appliance is displayed in response to detecting one or more user interactions with the mobile device. Such a user interaction may result in an expanded view of the notification, the expanded view of the notification comprising the option to initiate the command. Advantageously, this means the amount of screen space occupied by the command may be minimised until it is determined that the user may be interested in the notification and/or initiating a command for the environmental control system. This may be particularly advantageous in cases where options for more than one command are displayed in the notification, for example two, three or four commands, and thus the space required to display the options for the commands is greater.

In preferred embodiments, the option to initiate the command is displayed in response to a single user interaction. Thus the command may be effected in response to only two user interactions, e.g. a first user interaction causing the option for the command to be displayed (e.g. display of an expanded view of the notification which comprises the option for the command to be displayed), and a second user interaction in which the user selects the command, which causes the command to be effected.

Such a user interaction may be that the user has selected the notification. Alternatively, such a user interaction could comprise a user picking up the mobile device (which may be detected by an accelerometer in the mobile device) or a user pressing any button or tapping anywhere on a touchscreen of the mobile device. This may be advantageous when the device is in a locked state. In some embodiments, the application may be configured such that any one of these interactions triggers display of the option to initiate the command.

In other embodiments, the option to initiate the command is displayed in response to two or more user interactions. For example, a notification may be displayed in response to determining that an environmental parameter of the premises satisfies a condition, after which the user may select the notification to result in display of a more detailed view of the notification. Such a more detailed view of the notification may include an option to view the notification in an expanded view. Then the user may select the option for the expanded view, which comprises one or more options to initiate one or more commands.

Selecting the notification or option may comprise touching a portion of a touchscreen on the mobile device on which the notification is displayed, such as tapping on or swiping the notification. Selecting the notification or option may comprise positioning a cursor on part of the notification and actuating a command on a cursor controller (such as clicking a button on a computer mouse).

Preferably, the option to initiate a command effecting control of at least one appliance is displayed in response to detecting one or more of the following user interactions with the mobile device: a swipe gesture on the notification; a tap on the notification; a press on the notification for more than a predetermined time, and a press on the notification having an increased pressure.

The predetermined time for pressing on the notification in order to display the command option may be 15 ms, 20 ms, 50 ms, 0.1 seconds, 0.2 seconds, 0.5 seconds, 0.8 seconds, 1 second etc. The predetermined time required to trigger display of the command will normally be less than 3 seconds.

A press having increased pressure is sometimes referred to as a "firm press" and is distinguished from a "tap". The pressure may be increased with respect to the pressure to initiate a "tap". The pressure may also be distinguished from that of a "light press".

In other embodiments, the option to initiate the command may be automatically displayed in the notification upon determining that the environmental parameter satisfies a condition. In such a case, a user interaction may not be required in order for the option for the command to be displayed. This can result in only a single user interaction being required in the method in order to actuate the command.

In some embodiments, the mobile device has a locked mode and an unlocked mode; and the method is performed while the mobile device is in a locked mode, without the unlocked mode being activated; and/or wherein the step of displaying a notification to a user comprises displaying the notification on a lock screen of the mobile device.

Displaying the notification to the user when the mobile device is in a locked mode and, optionally, allowing the user to select a command and send the command to the environmental control system whilst in the locked mode, may provide a more efficient and quicker method of executing commands when the user has not unlocked their device.

The locked mode may comprise a mode in which one or more user inputs are disabled. For example, a touchscreen on the mobile device may be disabled, or certain functions on the touchscreen may be disabled. Additionally or alternatively, one or more input buttons may be disabled. For example in the locked mode it may be possible to initiate only a very small selection of commands (e.g. to unlock the device and/or to take a photograph and/or answer an incoming call). A lock screen may be displayed on the screen of the mobile device when the mobile device is in a locked mode.

Such a locked mode may prevent inadvertent user inputs to the device, for example while a device is stored in a bag or pocket. A locked mode may also prevent unauthorised use of the device, for example if authentication such as a PIN, fingerprint, voice or face recognition is required to unlock the device. In the unlocked mode, all or most of the inputs of the mobile device may be available or usable, for example by touching a touchscreen, pressing one or more buttons, voice recognition etc.

In embodiments then, responsive to an automated prompt for user input on a mobile device, an environmental control system command can be input, or equivalently a change of state or operation of an environmental control system can be effected, with only one, or only two user actions, such as a tap or swipe or soft key press for example.

Preferably, the command effecting control of at least one appliance is based on one or more of: one or more user-adjusted parameters; and a learnt user behaviour model based on one or more previous control commands initiated by the user.

Preferably, the application, in the foreground state, is arranged to present the user with an option to adjust the one or more user-adjusted parameters on which the command is based.

Preferably the (one or more/plurality of) command(s) effecting control of at least one appliance displayed are selected from a plurality of possible or predetermined commands. Thus it may be possible to display only the options for command(s) that are relevant to the situation/user, and thus commands that the user is likely to wish to effect. Advantageously, the selection of the displayed command(s) may be determined based on the geolocation threshold and/or the condition satisfied by the environmental parameter. For example, if the condition that is satisfied is that the temperature setpoint is below a certain value (e.g. 20° C.), one of the options displayed may be associated with a command to set the temperature setpoint to that value (e.g. 20° C.).

In some examples, the method may further comprise the step of: ranking a plurality of possible commands according to at least one criterion. Thus an ordered list of the commands may be produced in order of the relevance of the commands, or the priority of displaying the command in the particular circumstances.

Thus the method may further comprise the step of: selecting one or more commands to present to the user based on the ordered/prioritised list. The notification may thus comprise an option to initiate the highest priority command in the list.

In some embodiments, options for two or more commands (e.g. three, four or five commands) may be presented in the notification. Such presented options may be selected from a larger number of possible options. In such cases, the top, or highest priority, commands in the ordered list may be selected for display.

The number of command options displayed may be based on the type of mobile device. For example, it may be possible to display more command options on the screen of a tablet or smartphone than on the screen of a smart watch.

The user-adjusted parameters may include the geolocation threshold, the condition satisfied by the environmental parameter and/or a first predetermined setpoint value and/or a second predetermined setpoint value.

Additionally or alternatively the predetermined geolocation threshold is user-adjustable, preferably the application is capable of presenting, or configured to present, a user with an option to adjust the predetermined geolocation threshold when the application is in the foreground state.

In some embodiments the geolocation threshold is a locus of points a predetermined distance from a location. The location may be the premises controlled by the environmental control system.

The distance of the geolocation threshold from the location may be, for example, at least 200 m and not more than 30 km. The geolocation threshold may be at least 300 m, at least 500 m, or at least 700 m. In some embodiments the geolocation threshold may be at least 1 km.

Alternatively, or additionally, the distance of the geolocation threshold from the location may be less than or equal to 25 km, not more than 20 km or not more than 15 km. In some embodiments the geolocation threshold may be not more than 10 km or not more than 8 km.

In some embodiments there may be a plurality of geolocation thresholds. Each geolocation threshold may be associated with one or more conditions or predetermined values for an environmental parameter or characteristic. In some embodiments, each geolocation threshold may be associated with at least two predetermined values or conditions for an environmental parameter and a notification may be triggered, and thus displayed to a user, if the environmental parameter satisfies a first condition or a second condition, for example, if the environmental parameter is below a first predetermined value or above a second predetermined value.

In some embodiments, the direction in which the mobile device crosses the geolocation threshold may be relevant. Such directionality may be associated with one or more conditions to be satisfied, or with one or more predetermined values of an environmental parameter.

For example, a notification may be triggered, or displayed, to a user if it is detected that a mobile device has crossed a geolocation threshold, $X_0$, in a first direction (e.g. moving towards the premises, for example if the distance between the mobile device and the premises decreases from $X_0+\delta$ to $X_0-\delta$, where $\delta$ is small) and an environmental condition/parameter satisfies a certain condition, e.g. the parameter is below a first predetermined value (e.g. temperature setpoint below 20° C.), but a notification may be triggered if it detected that the mobile device has crossed the geolocation threshold, $X_0$, in a second direction (e.g. moving away from the premises, for example if the distance between the mobile device and the premises decreases from $X_0-\delta$ to $X_0+\delta$) and an environmental condition is above a predetermined value (e.g. temperature setpoint above 18° C.).

Optionally, the condition is associated with the geolocation threshold.

By associating the condition with the geolocation threshold it may be possible to provide a command that is tailored to the user's location. For example, there may be a first geolocation threshold associated with a first condition and a second geolocation threshold associated with a corresponding second condition.

For example, the user may be able to adjust the position of the geolocation threshold and the corresponding condition in order to best suit their preferences.

Preferably, the command effecting control of at least one appliance comprises a command to alter a target setpoint of the environmental parameter, preferably a command to adjust the target setpoint to a user-adjusted parameter, optionally wherein the user-adjusted parameter is associated with the crossed geolocation threshold.

A target setpoint may be set by the user, for example 'Set to 17° C.'/'Set to 8° C.'. For example a setpoint for the environmental condition provided by a user-programmed control schedule for the environmental control system may be altered for a predetermined amount of time. For example, the setpoint may be altered to a certain value for about 30 minutes, about an hour, about two hours, or about four hours. In some embodiments, the setpoint may be adjusted to a predetermined value until the next event in the user-programmed control schedule.

Preferably, the command effecting control of at least one appliance comprises a command to change or alter a mode of the environmental control system. For example, the command may be to set (or return) the mode to a preset schedule ('set to schedule') or to set the mode to a boost mode ('set to boost'). In some embodiments, the command may alter a mode of an appliance in the environmental control system, e.g. of a central heating system or of an air conditioning unit. For example, changing the mode of an appliance to "boost" may activate the appliance, regardless of any preset schedule.

In some embodiments, the command may alter environmental control settings indefinitely (e.g. until the next user command to alter the setting).

In some embodiments, the notification comprises: a first option to initiate a first command to effect control of at least one appliance; and a second option to initiate a second command to effect control of at least one appliance, wherein the second command is different from the first command.

Thus the user may choose between at least two different commands. In some embodiments, the first command effects control of a first appliance and the second command effects control of a second appliance. In other embodiments, the first and second commands effect control of the same appliance, but in a different manner.

Preferably, the method further comprises: detecting that the user has selected the option to initiate the first command; and detecting that the user has selected the option to initiate the second command; preferably wherein: the message sent to the environmental control system comprises the first command and the second command. Thus it may be possible to reduce the number of messages sent to the environmental control system.

Preferably, sending to the environmental control system a message to effect the command comprises: sending a message comprising the command to a thermostat, optionally over a wireless network.

For example the command may be sent to a device, such as a hub, or to the thermostat itself, over a wireless network, such as a wireless wide area network (or wireless WAN), such as a cellular or mobile network, for example using technology such a GSM, CDMA, AMPS, GPRS, 2G, 3G or 4G. Where the command is sent to a hub at the premises, the command may be transferred to the thermostat via a wireless local area network (WLAN), such as Zigbee or WiFi™ 802.11.

Preferably, determining that an environmental parameter of the premises satisfies a condition comprises: comparing the environmental parameter to a predetermined value, preferably wherein the predetermined value is one of the user-adjustable parameters.

Preferably, comparing the environmental parameter to a predetermined value comprises determining that the environmental parameter is above or below the predetermined value.

For example, the condition may be satisfied if a temperature setpoint for the premises is above 20° C., or it may be satisfied if a measured temperature is below 18° C.

Preferably, determining that an environmental parameter of the premises satisfies a condition comprises: determining that a target setpoint satisfies the condition; or determining that a measured value satisfies the condition.

For example, it may be determined whether a temperature or humidity setpoint for the premises satisfies the condition. The setpoint may be a setpoint from a schedule that has been input by the user. Alternatively it may be determined whether a measured value of an environmental characteristic, such as a sensed room temperature or humidity of the premises satisfies the condition.

Preferably, the condition is selected by the user.

In some embodiments, the premises comprises at least a first zone and a second zone, each zone being independently controllable by the environmental control system; and wherein the step of determining that an environmental parameter of the premises satisfies a condition comprises: determining that an environmental parameter of at least one of the zones satisfies a condition; and wherein the command comprises a command to alter an environmental control setting for the at least one of the zones.

Preferably, the method further comprises: determining whether an environmental parameter of the first zone satisfies a first condition; determining whether an environmental parameter of the second zone satisfies a second condition associated with the second zone, wherein the first condition is settable independently from the second condition; wherein the notification comprises: a first option to initiate a command to alter an environmental control setting for the first zone if the environmental parameter of the first zone satisfies the first condition; and a second option to initiate a command to alter an environmental control setting for the second zone if the environmental parameter of the second zone satisfies the second condition; and, sending, to a first thermostat operable to control an environmental parameter of the first zone, a message comprising the command to alter the environmental control setting for the first zone; and, sending, to a second thermostat operable to control an environmental parameter of the second zone, a message comprising the command to alter the environmental control setting for the second zone.

Thus it may be possible to provide control for different zones at a premises based on a user interaction, or interaction session, with a notification. This can result in energy savings, for example if different zones in the premises are kept within different comfort states.

Preferably, the premises comprises at least a first zone and a second zone, each zone being independently controllable by the environmental control system; and wherein the step of determining that an environmental parameter of the premises satisfies a condition comprises: determining that an environmental parameter of the first zone and an environmental parameter of the second zone satisfy a condition; and wherein the command effecting control of at least one appliance comprises a command to alter an environmental control setting for the first zone and for the second zone. For example, the command may alter the environmental control setting for the first zone and the second zone in the same way or manner, e.g. changing the setpoint of an environmental characteristic to the same value for both zones.

Preferably, the method further comprises: sending a single message to the environmental control system to alter the environmental control setting for the first zone and for the second zone, preferably wherein the environmental control system comprises a hub at the premises, and wherein the method further comprises: sending, by the hub, a message to a first thermostat operable to control an environmental parameter of the first zone, a message comprising a command to alter the environmental control setting for the first zone; and sending, by the hub, a message to a second thermostat operable to control an environmental parameter of the second zone, a message comprising a command to alter the environmental control setting for the second zone.

Thus a single message may be sent (e.g. over a WAN) to the environmental control system to actuate the same command for different zones, rather than sending separate messages for each zone. This may reduce network traffic.

In some embodiments, a single message may be sent to the environmental control system to effect a first command for a first zone and a second command for a second zone, for example where the commands are different, or change different control settings for each zone. This message may be received by a hub at the premises and the hub may send the first command to a controller for the first zone (e.g. a first thermostat) and a second command to a controller for the second zone (e.g. a second thermostat).

Preferably, the environmental control system comprises one or more heating, ventilation and/or air conditioning, HVAC, devices. For example, the at least one appliance may be an HVAC device. The environmental control system may also comprise a humidifier or dehumidifier.

Preferably, the environmental control system is an HVAC system.

Preferably, the environmental parameter comprises one of: a temperature; and a humidity. For example a room temperature or a room humidity. The parameter may be a setpoint for the temperature or humidity, or it may be a measured environmental characteristic, such as a measured temperature or humidity.

Preferably, the mobile device is selected from the group comprising: a mobile telephone; a laptop; a tablet; and a watch, e,g a smartphone or a smartwatch.

There is also described herein a computer program product operable to program a network device to operate according to the method set out above.

Preferably, the computer program product is further operable to program a network device to operate according to a method comprising, when the application is in the foreground state: determining that the mobile device has crossed a predetermined geolocation threshold; determining that an environmental parameter of the premises satisfies a condition; displaying, on a screen of the mobile device, a notification to a user, the notification comprising an option to initiate a command effecting control of at least one appliance; detecting that the user has selected the option to initiate the command; and sending to the environmental control system a message to effect the command. Such a notification may be displayed in a notification banner on a portion of the screen (e.g. not more than 20%, not more than 25% or not more than 50% of the screen), whilst (at least some of) the remainder of the screen is occupied with the application in its foreground state.

There is also described a tangible, non-transitory computer-readable medium comprising software code adapted, when executed on a data processing apparatus, to perform a method as set out above.

There is also described herein a mobile device for controlling an environmental control system including at least one appliance for influencing one or more environmental parameters at a premises, the mobile device comprising: a wireless communications interface operable to receive information indicative of the location of the mobile device and to send and receive messages to and from the environmental control system; a screen for displaying information to a user; a memory storing an application for sending commands to the environmental control system, the application having at least: a foreground state for controlling the environmental control system based on a plurality of user-adjustable parameters for the one or more environmental parameters, wherein the application is arranged, using a screen of the mobile device to interact with a user, to present the user with an option to adjust one or more of the user-adjustable parameters in the foreground state; and at least one background state, wherein the application is arranged to generate user notifications in the background state; and a processor operable, when the application is in a background state, to: determine that the mobile device has crossed a predetermined geolocation threshold; receive an indication that an environmental parameter of the premises satisfies a condition; display, on the screen of the mobile device, a notification to a user, the notification comprising an option to initiate a command effecting control of at least one appliance; detect that the user has selected the option to initiate the command; and send to the environmental control system a message to effect the command.

Where reference is made above to means for performing a given processing step, such means may be provided in the form of a processor with associated memory (e.g. storing software code for execution by the processor).

Any feature in one aspect of the invention may be applied to other aspects of the invention, in any appropriate combination. In particular, method features may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Embodiments will now be described, by way of example only and with reference to the accompanying drawings, in which.

DETAILED DESCRIPTION OF THE INVENTION

Figure 1:
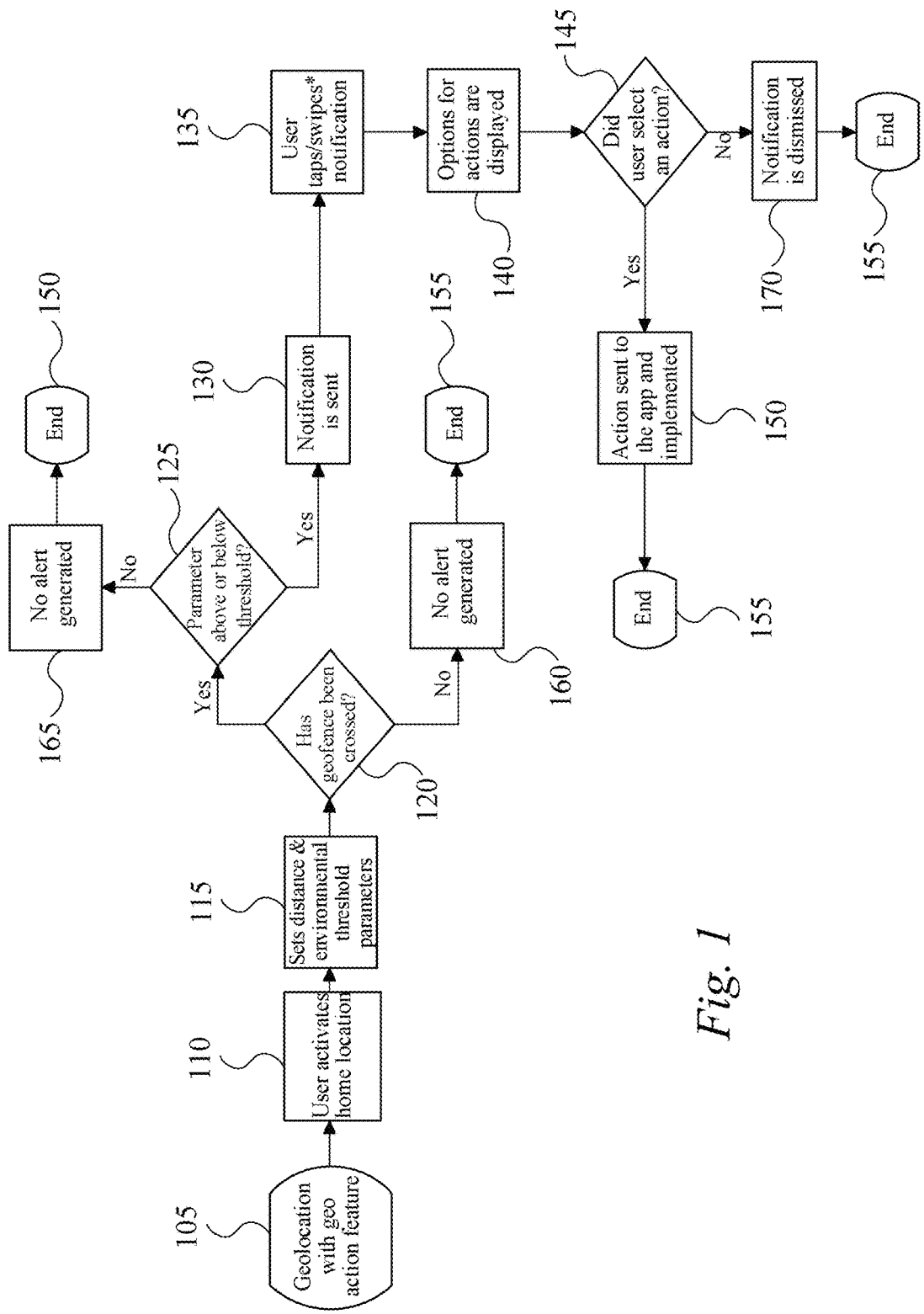
FIG. 1 shows an exemplary method for controlling an environmental control system from a mobile device.

FIG. 1 illustrates an exemplary method for controlling an environmental control system from a mobile device.

The method starts at step 105, where a user opens the geolocation feature of an application for sending commands to the environmental control system. The application is in a foreground state, and occupying at least a portion of the screen of the mobile device.

At step 110, a user activates the home location, or the location of their premises. This may, for example, comprise setting a parameter indicating the geolocation of their premises. This may be achieved by confirming that the mobile device is at the premises, then the application can obtain the current location of the mobile device from a location module on the mobile device. Location data may be received, for example, over a WLAN, such as a cellular communications network. Alternatively, the user may enter a geographical co-ordinate as the location of the premises.

At step 115 the user sets one or more distance and environmental threshold parameters. This includes setting at least one geolocation threshold, such as a distance from the premises, and an environmental condition, such as a threshold temperature or humidity. One or more sets of distance and environmental threshold parameters may be set. Preferably, each distance parameter is associated with at least one environmental parameter or condition. In some embodiments, a user may be able to set multiple environmental threshold parameters for each location parameter. For example, a temperature and a humidity condition, and/or a temperature or humidity range. In some embodiments, the user also specifies whether the condition should be checked when the threshold is crossed in a first or a second direction. For example, if the user is leaving the premises, they may want to ensure heating is set fairly low (or air conditioning is not set too low) to save energy. However if a user is returning to the premises, they may want to check that the setpoint temperature is high enough/low enough/within a predetermined range, for example by setting a "comfort zone".

In some embodiments a geolocation threshold comprises a specific location, for example a railway or underground station, a bus station, or a point on a road. Such a geolocation threshold may be chosen by the user as a particular place they often pass on their way to/from the premises.

The app may then transition to a background state, such as running in the background, terminated or suspended.

At step 120 it is determined whether a geofence has been crossed. This may comprise determining whether one of the geolocation thresholds set at step 115 has been crossed, optionally in a given direction.

If the app is running in the background, it may receive geolocation data periodically (e.g. every 2, 5 or 10 minutes), or any time the mobile device location changes by more than a preset amount, such a 5 m, 10 m, 50 m or 100 m.

If the application is not running, e.g. if it is terminated or suspended, the application may be notified of the location if the location of the mobile device changes by more than a preset amount (e.g. an amount greater than when the application is running in the background, such as 500 m, 1000 m or 1500 m), and/or periodically (e.g. every 10, 15, 30 or 60 minutes). Such a notification may cause the application to transition into another background state, such that it is running in the background. When the application is running in the background it may make the determination as to whether the geofence has been crossed.

If the geofence has been crossed, the method progresses to step 125.

At step 125 a determination is made as to whether a parameter is above or below a threshold. This may comprise determining whether an environmental parameter satisfies a condition. This may also be based on the environmental threshold parameters set at step 115. If at step 125 it is determined that the condition is satisfied, the method progresses to step 130.

At step 130 a notification is sent to the user. For example, the notification may be displayed on the screen of the mobile device. The notification may comprise one or more pieces of information about the environmental control system. The notification may be displayed to a user on a lock screen of the mobile device, or if the user is currently using another application on the mobile device, the notification may be displayed on an active, or unlocked, screen of the mobile device, for example as a bar at the top of the screen.

At step 135 the user selects the notification to expand the view. For example the user may tap or swipe the notification to select it. In some embodiments, this step is not required because the first display of the notification includes the options for possible actions that the user may wish to execute.

At step 140 options for actions are displayed, for example on an expanded view of the notification. Such options may comprise one or more commands that may be sent to control the environmental control system, such as switching on/off an appliance or changing a setpoint.

At step 145 a determination is made as to whether the user has selected the action. For example, such a selection of the action may be by tapping the part of the screen on which the option is displayed.

If the user has selected the action, the method progresses to step 150, where the action is sent to the application and implemented. This may happen whilst the application remains in a background state (e.g. a state of running in the background). For example, the application may send a message to the environmental control system to effect the action.

The method then ends at step 155. If the application was originally in inactive/not running, e.g. in a terminated or suspended state, the application may return to its original state. If the application was running in the background, the application may continue running in the background.

If at step 120 it was determined that the geofence had not been crossed (or not been crossed in the relevant direction) then no alert is generated (step 160) and the method ends at step 155. Again, the application may transition to the state it was previously in, e.g. suspended or terminated.

If at step 125 it is determined that the environmental parameter does not satisfy the condition, the method progresses to step 165 and no alert is generated. The method then ends at step 155. Again, the application may transition to the state it was previously in, e.g. suspended or terminated.

If at step 145 it is determined that the user did not select an action, for example if no user input has been detected for more than a predetermined time period, or if the user actively closes or dismisses the notification (e.g. by touching or tapping part of the screen on which a "close"/"dismiss" option is displayed), then the notification is dismissed at step 170 and the method ends at step 155. The application may then continue running in the background or return to a suspended or terminated state.

Figure 2:
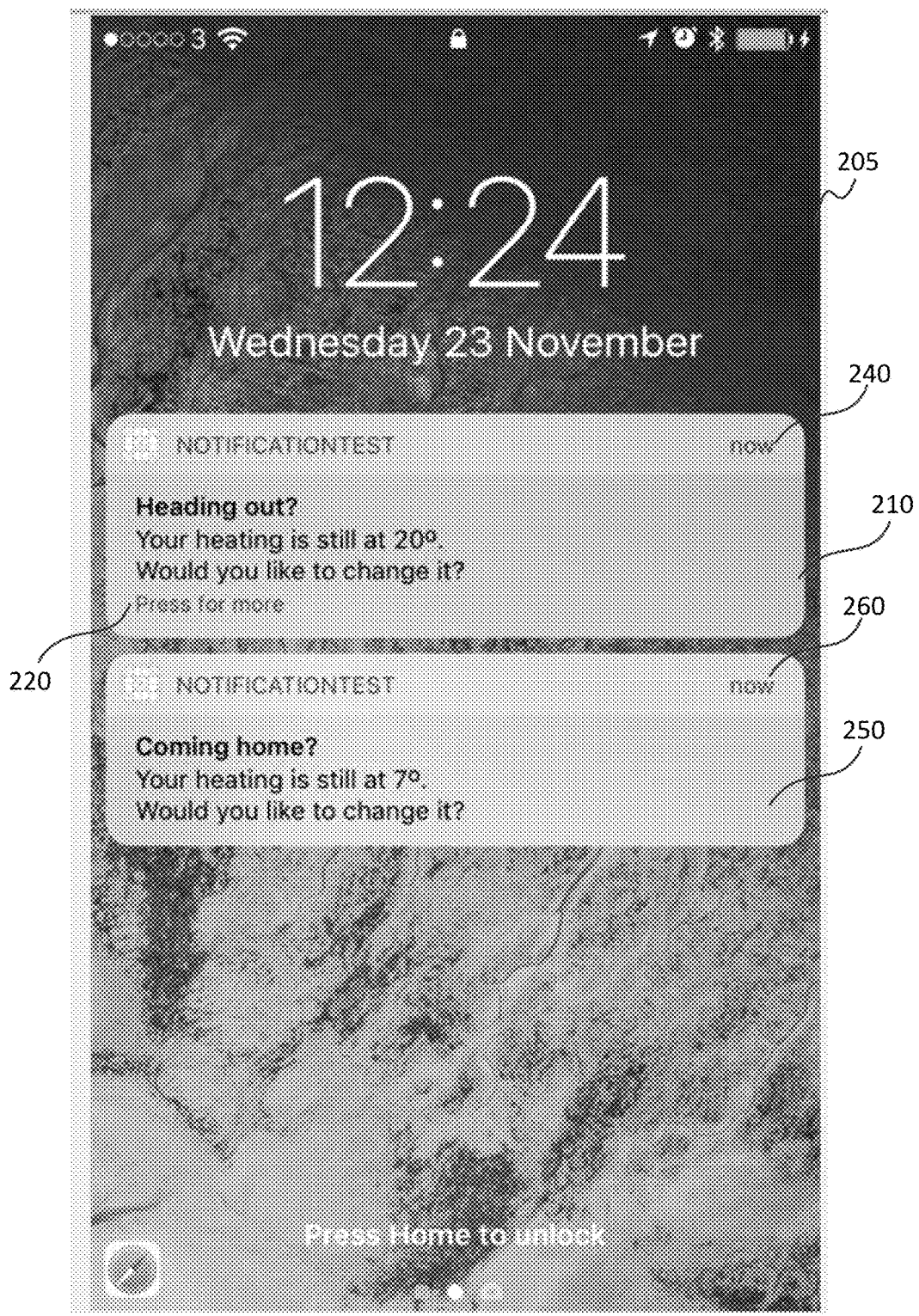
FIG. 2 shows an exemplary notification displayed on a lock screen of a mobile device.

FIG. 2 shows an example of notifications displayed on a lock screen 205 of a mobile device.

A first notification 210 is shown. The notification 210 asks whether the user is heading out. For example, the user's mobile device may have crossed a geolocation threshold in a direction moving away from the premises.

The notification 210 also displays to the user the current temperature the heating is set to (in this case a setpoint of 20° C.). The user is given the option 220 of pressing the notification 210 for more information and/or to effect a change in the heating. The notification also displays the time 240 at which it was generated, in this case, now.

A second notification 250 is also displayed. This notification 250 asks whether the user is coming home. For example, the user's mobile device may have crossed a geolocation threshold in a direction moving towards the premises.

The second notification 250 also displays to the user the current temperature the heating is set to (7° C.). The notification also displays the time 260 at which it was generated, in this case, now.

In this case two notifications are shown as exemplary notifications only, having different current temperature settings. Such example notifications may be shown or provided individually, however in embodiments multiple simultaneous notifications may be possible.

Figure 3:
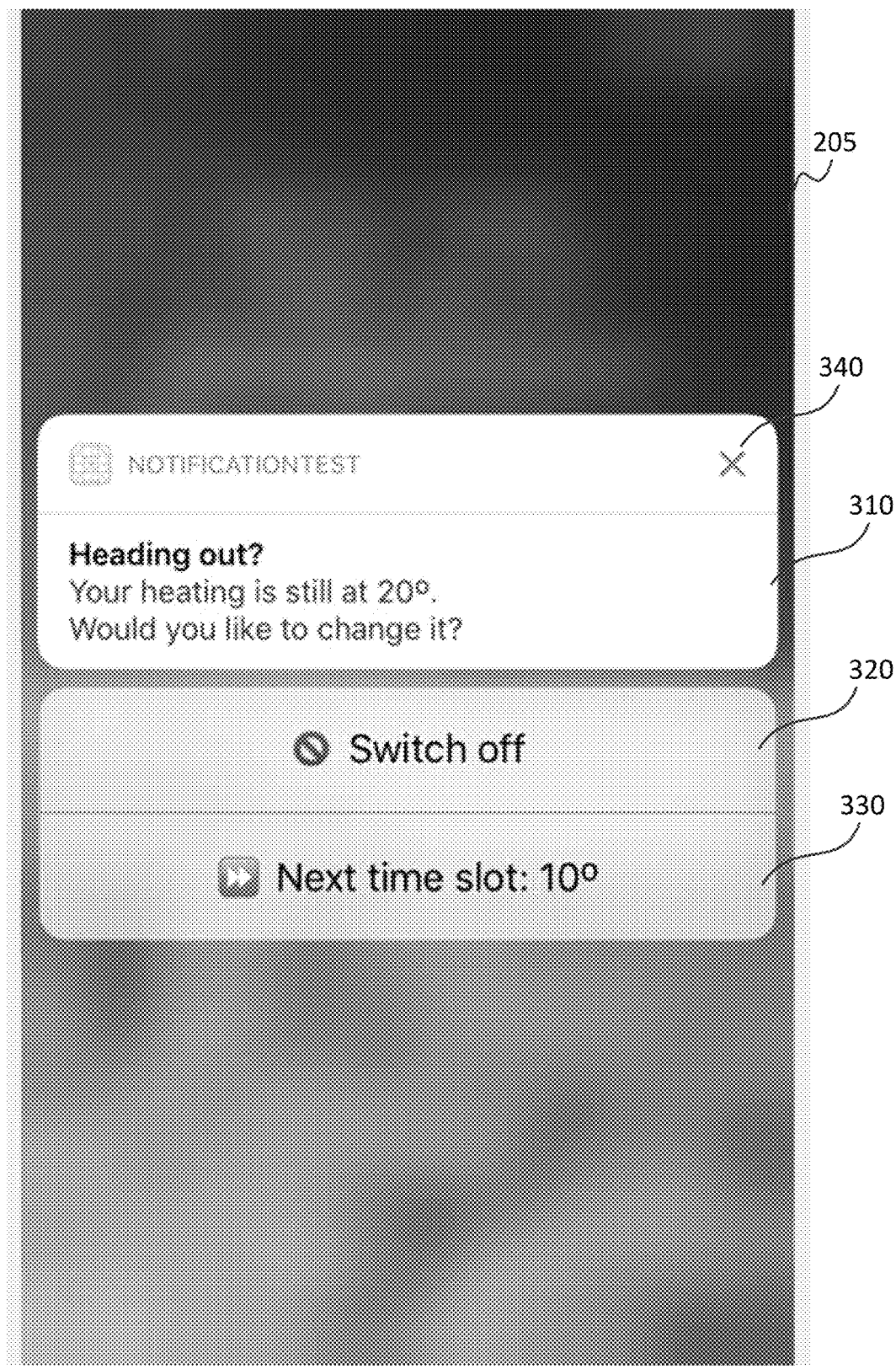
FIG. 3 shows an exemplary notification including a command option.

FIG. 3 shows another example of a notification 310 displayed on the lock screen 205 of a mobile device.

The notification 310 asks the user if they are heading out and informs the user that their heating is still at 20° C. In some examples, the notification 310 may be displayed following a user pressing on or otherwise selecting the first notification 210 of FIG. 2. For example, the notification 310 shown in FIG. 3 may be the expanded view of the first notification 210 of FIG. 2.

A first option 320 is displayed as part of the notification 310. The first option 320 represents a command to switch the heating off. If the user selects the first option 320, for example by tapping or pressing on the part of the screen 205 on which the option 320 is displayed, a message will be sent to the environmental control system which effects a command to switch the heating off. For example, a message may be sent to a thermostat at the premises.

A second option 330 is also displayed as part of the notification 310. This second option 330 represents a command to change the setpoint of the heating system to the next scheduled setpoint. The second option 330 also contains the information that the next setpoint in the schedule is 10° C. If the user selects the second option 330, a message may be sent to the thermostat to reduce the temperature setpoint to 10° C. and/or to progress the schedule to the next setpoint.

There is also displayed the option 340 to close or dismiss the notification 310 displayed on the lock screen 205 of a mobile device.

Figure 4:
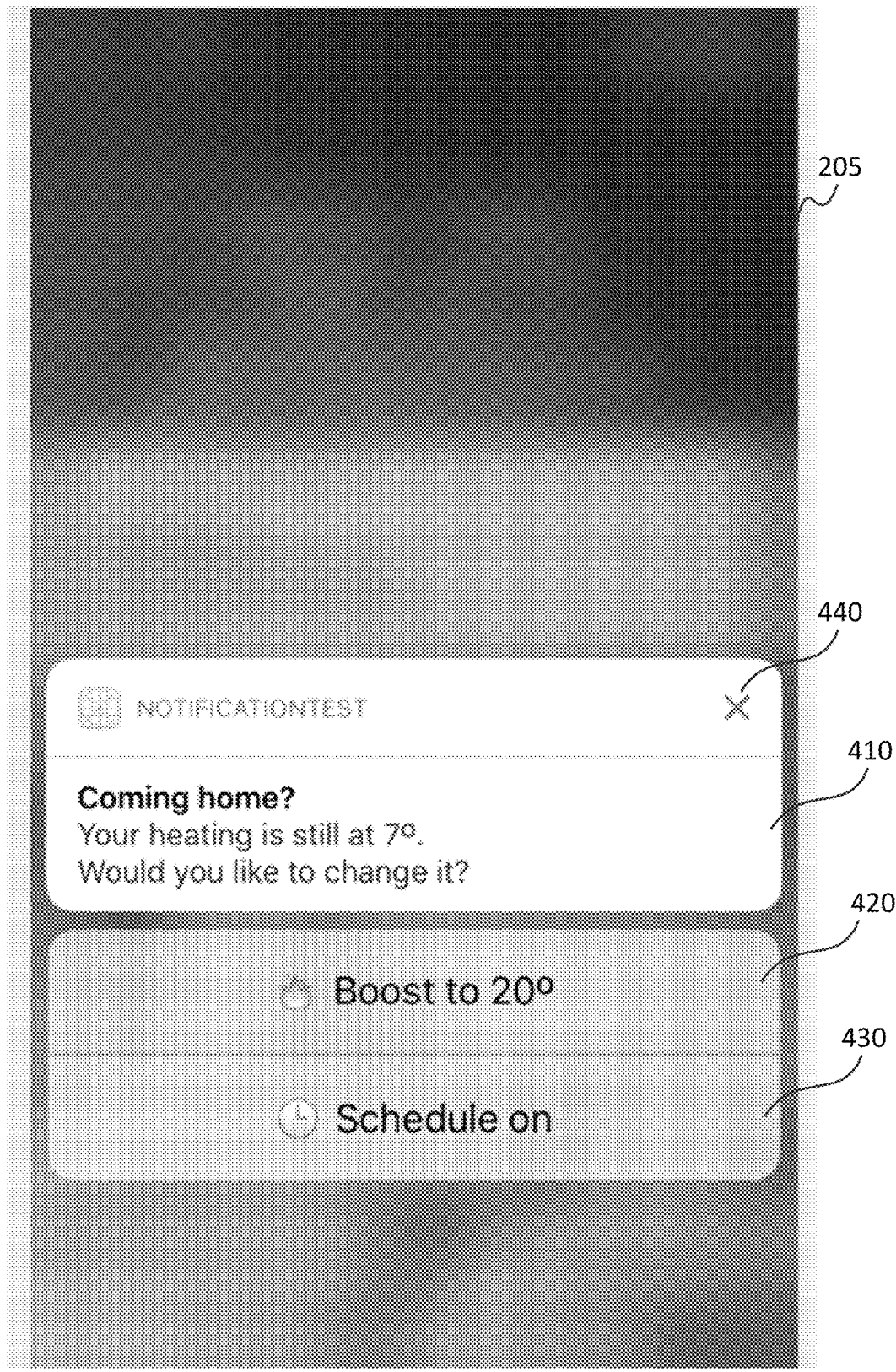
FIG. 4 shows an alternative exemplary notification including a command option.

FIG. 4 shows another exemplary notification 410 displayed on the lock screen 205 of a mobile device. The notification 410 may be displayed following the user selecting the second notification 250 of FIG. 2. For example, the notification 410 may be the expanded view of notification 250.

The notification 410 asks the user if they are coming home and displays to the user the information that their heating is still set to a setpoint of 7° C.

The notification 410 comprises a first option 420, which relates to boosting the temperature setpoint to 20° C. If the user selects the first option 420, a message will be sent to a thermostat in the environmental control system to increase the temperature setpoint to 20° C. This may change the temperature setpoint to 20° C. for a (predetermined) boost period, such as 30 minutes, 1 hour or 2 hours. Such a boost period may have been preset by the user.

The notification 410 also comprises a second option 430 to switch the schedule on. The user may have switched the schedule off previously (for example if they were on vacation, or if they left the premises unusually early, e.g. by selecting an option in a notification presented when their mobile device crossed a geofence) and by selecting the second option 430, the user can switch the schedule back on. Selecting the second option 430 results in the mobile device sending a message to the environmental control system to effect switching the schedule on.

There is also displayed the option 440 to close or dismiss the notification 410.

In some embodiments, the notifications shown in FIGS. 3 and 4 are not displayed on lock screens of a mobile device. For example, the notifications 210 and 250 of FIG. 2 may be displayed on a lock screen of the mobile device, and upon the user pressing, or otherwise selecting, the options for more, the user may be presented with a request to unlock the mobile device before displaying the expanded view of the notification. Such unlocking may be accomplished by entering a password, or providing a biometric identifier (e.g. a fingerprint or iris) to a detector on the mobile device. This may add a level of security, so that user verification is required before settings of the environmental control system are altered.

In some embodiments, no user interaction is required in order for the option to initiate a command to be displayed. For example, the first view of the notification displayed to a user once it has been determined that a geolocation threshold has been crossed and that an environmental parameter satisfies a condition may comprise one or more options to initiate a command. Then only one user interaction is required in order to effect the command. In one embodiment such a notification is displayed on a smart watch.

Figure 5:
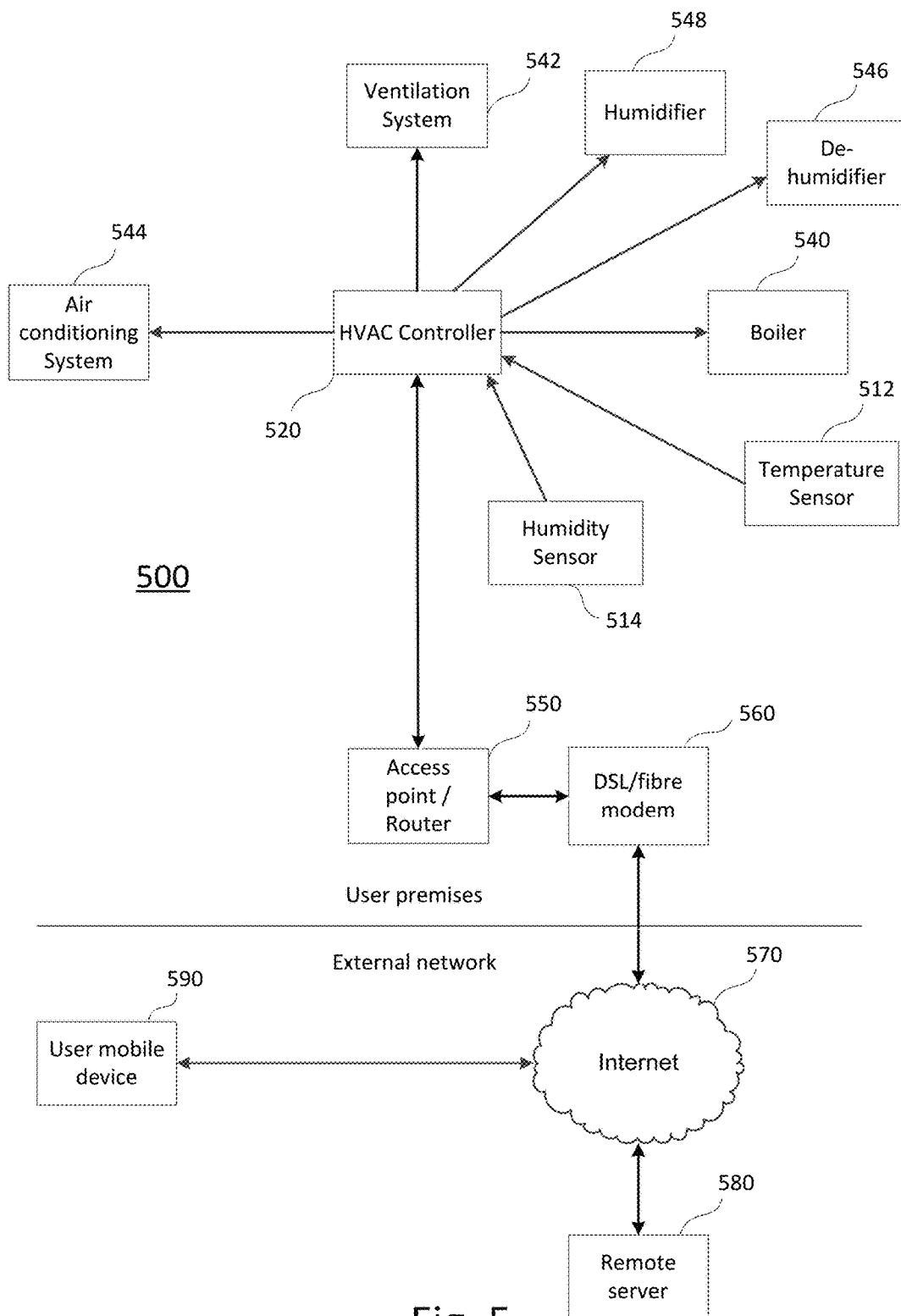
FIG. 5 illustrates a system diagram of an exemplary environmental control system.

FIG. 5 illustrates a system diagram of an exemplary environmental control system 500. The HVAC control and monitoring system 500 includes an HVAC controller 520 installed in a user's premises. The HVAC controller 520 is wirelessly connected to a temperature sensor 512 and a humidity sensor 514 installed within the user's premises. However one or both of the sensors 512, 514 may be combined in the HVAC controller 520. Alternatively the sensors 512, 514 may communicate with the HVAC controller 520 via wired connections.

The HVAC controller 520 may be, for example, a smart thermostat into which a user can program a heating, hot water or other environmental control schedule. The HVAC controller 120 is connected wirelessly to the user's local network/internet access infrastructure, for example, to a wireless or wired home router/access point 550, which in turn provides access to the Internet 570 through a modem 560, such as an ADSL or fibre modem. Depending on access technology, router 550 and modem 560 may be combined in a single device or replaced with other access devices appropriate to the access technology. Some embodiments may provide an additional hub device (not shown), e.g. connected to the boiler 540, to manage the HVAC system and coordinate between the components, store control/configuration data (e.g. heating schedules), and the like (such functionality may alternatively be implemented in the HVAC controller 520).

The HVAC controller 520 is wirelessly connected to various appliances. The appliances to which the HVAC controller is connected include a central heating/hot water boiler 540, a ventilation system 542, an air conditioning system 544, a de-humidifier 546 and a humidifier 548. The boiler 540 may, for example, be a conventional gas boiler arranged to provide a supply of heated water to a series of radiators in the user's premises and to a hot water tank for onward supply to hot water taps. The ventilation system 542 may be, for example, a humidity controlled ventilation system.

In some embodiments, the wireless connections between the HVAC controller 520 and each appliance are via a wireless receiver connected to each appliance by a wired connection. For example, a wireless receiver may be in wired communication with the air conditioning system 544 and in wireless communication with the HVAC controller 520. A separate wireless receiver may be provided for each appliance.

Although five HVAC components 540, 542, 544, 546, 548 are shown, in some embodiments fewer HVAC components or appliances may be provided, such as one or two, whilst in other embodiments there may be more and/or different HVAC components (optionally with wireless receivers) which can communicate wirelessly with the HVAC controller 520. In some embodiments the wireless receivers can be included in the HVAC components, such as the boiler or air conditioning system, rather than being provided as separate devices.

The HVAC controller 520 can store schedule and other information relevant to the control information of the HVAC components. The HVAC controller 520 can then send control and/or schedule information to the HVAC appliances 540, 542, 544, 546, 548. For example the user can program a schedule for hot water at the HVAC controller 120, and the HVAC controller 520 can then send the hot water schedule to the boiler 540. The boiler 540 can then use the schedule and temperature information received from the HVAC controller 520 to turn the boiler 540 on or off as needed. Alternatively, the HVAC controller 520 may send a control signal to the boiler 540 to instruct the boiler 540 to start or stop producing hot water each time hot water is required according to the schedule.

The user can also program space heating or other environmental control requirements into the HVAC controller 520. Typically, this involves programming a heating schedule specifying a set of set points applicable during respective time periods, each set point defining a target environmental characteristic value (e.g. temperature/humidity) to be achieved and maintained during the period. For example, the user may request a room temperature of 20° C. between 7 am and 9 am. Other periods in the schedule may be designated as "off" periods where no heating is required (though the system may nevertheless apply some minimum target e.g. 5° C. during such periods to protect against frost damage). The HVAC controller 520 receives a room temperature reading (either from its own internal temperature sensor, or from temperature sensor 512) and can provide control signals to the boiler 540 or to the air conditioning system 544 or ventilation system 542, as appropriate (e.g. to increase or decrease the temperature back to the scheduled target value).

The user may also interact with the HVAC system 500 from a mobile user device 590 located outside the user's premises on an external network and connected to the Internet 570. The user mobile device 590 may take the form of a smartphone, tablet computer, personal computer, smart watch and the like. The user mobile device 590 may include an application for controlling the environmental control system 500, for example to create or edit a heating/hot water schedule, switch between manual/scheduled operation, adjust temperature, activate boost mode, etc. The application may then send information to the HVAC controller 520 as required (e.g. to update a schedule).

There may also be provided a remote server 580, such as a cloud server, on an external network, which may be connected to the Internet 570. The HVAC controller 520 and/or the user's mobile device 540 may be in communication with the remote server or datacentre 580. The HVAC controller and/or the mobile device 590 can also or alternatively send control information and sensed information to the remote server 580 via its connection to the Internet 570. The remote datacentre 580 can log this information and store for analysis information ascribed to periods during which HVAC components are operating.

The user mobile device 590 will typically be capable of detecting its geographical location, for example via its connection to the Internet. The user mobile device 590 may receive data indicative of one or more environmental parameters at the premises via its connection to the Internet 570. For example, the mobile device 590 may receive an indication of the humidity measured by humidity sensor 514 or of the temperature sensed by temperature sensor 512. Alternatively, or additionally, the mobile device 590 may receive an indication of the current setpoint or preset range for an environmental characteristic, such as the temperature or humidity. The mobile device 590 may receive data indicative of the environmental parameter(s) periodically (e.g. every 10, 20 or 30 minutes). Additionally, or alternatively, the mobile device may receive such data on request, e.g. based on a user interaction (such as the user opening the environmental control application) or based on crossing a geofence.

The information indicative of the environmental parameter(s) may be sent to the application for controlling the HVAC system 500 stored on the mobile device 590. The information may be sent from the environmental controller 520 or from the remote server 580. When the mobile device 590 receives the information, the information may automatically be sent to the application whilst the application is in a background state (such as when the application is running in the background or when the application is in a terminated or suspended state). The information will normally be sent to the application if the application is in a foreground state (e.g. if the application is running in the foreground when the information about the environmental parameters is received).

Alternatively, or additionally, the information may be sent to the application once the application has transitioned into a running state (e.g. running in the foreground or running in the background). For example, the information may not be sent to the application when it is received on the mobile device whilst the application is in a terminated or suspended state. The mobile device 590 may wait until the application has transitioned into running in the background or running in the foreground in order to communicate any newly received information about the environmental parameters to the application.

In some embodiments, the information may be sent to the mobile device 590 upon the mobile device 590 requesting information about environmental parameters from the remote server 580 and/or from the HVAC controller 520. The application may be configured to instruct the mobile device request this information periodically (e.g. every 10, 20, 30 or 60 minutes) and/or upon the mobile device crossing a predetermined geolocation threshold. The mobile device 590 may then display notifications to a user based on the geolocation of the mobile device. For example, the mobile device 590 may be operable to display the notifications described in relation to any of FIGS. 2 to 4.

While this description has focused on the home environment, the invention can also be used in offices or other premises in which environmental conditions such as room temperature and humidity are controlled.

Although only a single temperature sensor and a single humidity sensor installed in at least one room in the user's premises are described above, in some embodiments multiple sensors may be provided at different locations within the premises so that more information about the performance of the HVAC system can be collected. For example, one temperature sensor and/or humidity sensor may be provided for each zone in the user's house. In some cases multiple sensors can improve the accuracy of the monitoring. Multiple HVAC controllers or thermostats may also be provided for controlling different zones at the premises.

It is also possible to position sensors outside the environment controlled by the HVAC system (e.g. air temperature and humidity sensor located outside a house). By measuring outside characteristics, it may be possible to provide better control for the system (e.g. more heat may be required to maintain a target room temperature if it is colder outside).

Figure 6:
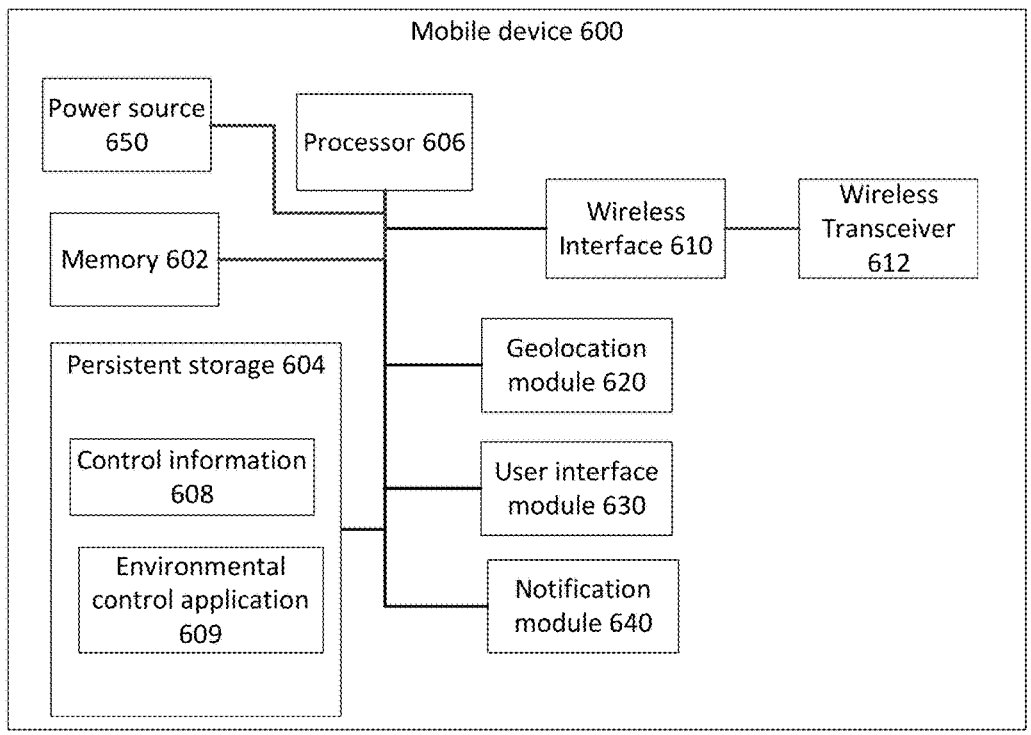
FIG. 6 illustrates the hardware architecture of an exemplary mobile device for controlling an environmental control system.

FIG. 6 illustrates the hardware architecture of an exemplary mobile device 600 that may be provided for controlling an environmental control system. For example, the mobile device 590 of FIG. 5 may have the hardware architecture as shown in the mobile device 600 of FIG. 6.

The user mobile device 600 includes a processor 606 together with volatile/random access memory 602 for storing temporary data and software code being executed. Random access memory 602 may be used to store geolocation information indicative of the current geographic location of the mobile device, and optionally one or more recent geographic locations of the mobile device 600 (for example so that the mobile device 600 may calculate in which direction a geolocation threshold has been crossed). Persistent storage 604 may store control information 608 and may store code for an environmental control application 609 by which a user may control an environmental control system located at a premises. Persistent storage 604 may include other software and data, such as an operating system, device drivers, software configuration data, historical location data, historical user command data, such as previously selected user commands, and the like.

Communication with the HVAC controller 520 and the remote server 580 via the Internet 570 may occur via a wireless network interface 610 and wireless transceiver 612. For example, the wireless transceiver 612 may be capable of connecting to the Internet via a wireless local area network (WLAN) such as Wi-Fi™ IEEE 802.11 or Zigbee, and/or via a wide area network (WAN) such as GSM, GPRS, CDMA, 3G, 4G or WiMAX IEEE 802.16. The wireless transceiver 612 may also allow communication by radio transmissions such as RFID (radio frequency identification) and/or Bluetooth™. In some cases, multiple wireless transceivers, and optionally multiple wireless interfaces, may be provided for different communication protocols.

The mobile device 600 also includes a geolocation module, or component, 620, which can receive data from the wireless transceiver 612 via the wireless interface 610 in order to determine the geolocation of the mobile device 600. For example, the data may include Global Positioning Satellite (GPS) information. The geolocation module/component 620 may also use data from an in-built compass device in order to determine the geolocation and/or the direction of travel of the mobile device 600.

The geolocation information may be passed from the geolocation module 620 to the processor 606, which stores the information in memory 602 and/or persistent storage 604 for use in generating geolocation notifications.

A user interface module/component 630 is also included in the mobile device 600 for interacting with the user, such as for displaying information and options on a screen of the device 600, for producing sounds and movement (e.g. vibrations) and for receiving user interactions such as touch data from a touchscreen, button data or voice data.

The mobile device 600 also includes a notification module/component 640 for generating notifications to be communicated to the user. The notifications may be sent to user interface module 630 for communication to the user, e.g. by display on a screen of the mobile device 600. The notifications may be generated in the notification component 640 based on instructions from the environmental control application 609.

The device components are interconnected by a data bus (this may in practice consist of several distinct buses such as a memory bus and I/O bus).

The mobile device also comprises a power source 650 for providing power to the mobile device 600, for example a battery or cell arrangement.

While a specific architecture is shown, any appropriate hardware/software architecture may be employed.

Figure 7:
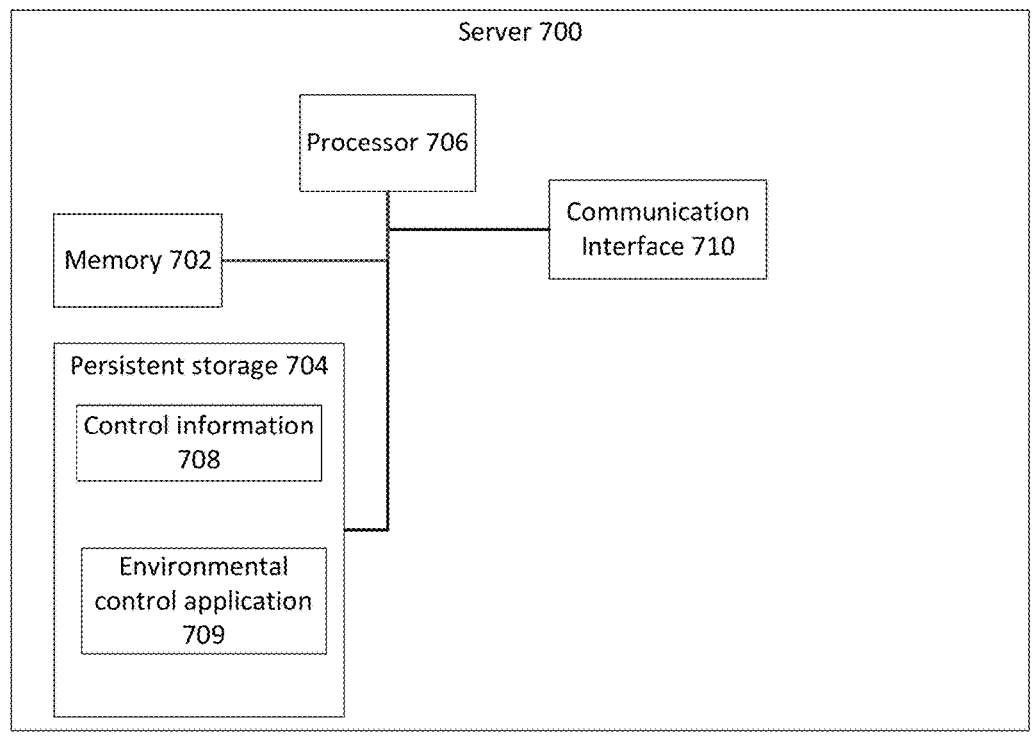
FIG. 7 illustrates the hardware architecture of an exemplary server.

FIG. 7 illustrates the hardware architecture of an exemplary server 700, which may, for example, be used as remote server 580 in FIG. 5. The server 700 includes a processor 706 together with volatile/random access memory 702 for storing temporary data and software code being executed. Persistent storage 704 may store control information 708 and may store code for an environmental control application 709 by which the server 700 may interact with an environmental control system located at a premises and with an environmental control application on a user's mobile device, such as application 609 shown in FIG. 6. Such interaction/communication may be via the Internet 580. Persistent storage 704 may include other software and data, such as an operating system, device drivers, software configuration data, and the like.

Communication with the HVAC controller 520 and the mobile device 590 may occur via a communication interface 710, through which the server 700 may connect to a WAN such as the Internet 570. This may be through wired or wireless connections While a specific architecture is shown, any appropriate hardware/software architecture may be employed.

Whilst described mainly in the context of domestic HVAC systems, the invention may also be used in office environments or anywhere with temperatures or other environmental characteristics to be controlled.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A method of controlling, from a mobile device, an environmental control system including at least one appliance for influencing one or more environmental parameters at a premises; wherein the mobile device comprises an application for sending commands to the environmental control system, the application having at least:
   a foreground state for controlling the environmental control system based on a plurality of user-adjustable parameters for the one or more environmental parameters, wherein the application is arranged, using a screen of the mobile device to interact with a user, to present the user with an option to adjust one or more of the user-adjustable parameters in the foreground state; and
   at least one background state, wherein the application is arranged to generate user notifications in the background state; the method comprising the steps of, when the application is in a background state:
   determining that the mobile device has crossed a predetermined geolocation threshold;
   determining that an environmental parameter of the premises satisfies a condition;
   displaying, on a screen of the mobile device, a notification to a user, the notification comprising an option to initiate a command effecting control of at least one appliance;
   detecting that the user has selected the option to initiate the command; and
   sending to the environmental control system a message to effect the command;
   wherein the command effecting control of at least one appliance is selected from a plurality of commands and the method further comprises the step of ranking the plurality of commands into a prioritised list according to at least one criterion.

2. A method according to claim 1, wherein the method is performed without the application transitioning to the foreground state.

3. A method according to claim 1, wherein detecting that the user has selected the option to initiate the command is by detection of a single user interaction with the mobile device.

4. A method according to claim 1, wherein the option to initiate a command comprises a graphical object associated with the command; and wherein detecting that the user has selected the option to initiate the command comprises detecting that the user has selected the graphical object.

5. A method according to claim 1, wherein the method comprises no more than two user interactions.

6. A method according to claim 1, wherein the mobile device has a locked mode and an unlocked mode; and
   wherein the method is performed while the mobile device is in a locked mode, without the unlocked mode being activated; and/or
   wherein the step of displaying a notification to a user comprises displaying the notification on a lock screen of the mobile device.

7. A method according to claim 1, wherein the command effecting control of at least one appliance is based on one or more of:
   one or more user-adjusted parameters; and
   a learnt user behaviour model based on one or more previous control commands initiated by the user.

8. A method according to claim 7, wherein the application, in the foreground state, is arranged to present the user with an option to adjust the one or more user-adjusted parameters on which the command is based.

9. A method according to claim 1, wherein the condition is associated with the geolocation threshold.

10. A method according to claim 1, wherein the command effecting control of at least one appliance comprises one of:
    a command to alter a target setpoint of the environmental parameter; and
    a command to alter a mode of operation of the environmental control system; and
    a command to alter the mode of an appliance in the environmental control system.

11. A method according to claim 1, wherein the notification comprises:
    a first option to initiate a first command to effect control of at least one appliance; and
    a second option to initiate a second command to effect control of at least one appliance, wherein the second command is different from the first command; and
    wherein the method further comprises:
    detecting that the user has selected the option to initiate the first command; and
    detecting that the user has selected the option to initiate the second command.

12. A method according to claim 1, wherein determining that an environmental parameter of the premises satisfies a condition comprises:
    comparing the environmental parameter to a predetermined value.

13. A method according to claim 1, wherein determining that an environmental parameter of the premises satisfies a condition comprises:
    determining that a target setpoint satisfies the condition; or
    determining that a measured value satisfies the condition.

14. A method according to claim 1, wherein the premises comprises at least a first zone and a second zone, each zone being independently controllable by the environmental control system; and wherein the step of determining that an environmental parameter of the premises satisfies a condition comprises:
  determining that an environmental parameter of at least one of the zones satisfies a condition; and
  wherein the command comprises a command to alter an environmental control setting for the at least one of the zones.

15. A method according to claim 14, further comprising:
determining whether an environmental parameter of the first zone satisfies a first condition;
determining whether an environmental parameter of the second zone satisfies a second condition associated with the second zone, wherein the first condition is settable independently from the second condition;
wherein the notification comprises:
  if the environmental parameter of the first zone satisfies the first condition, a first option to initiate a command to alter an environmental control setting for the first zone; and
  if the environmental parameter of the second zone satisfies the second condition, a second option to initiate a command to alter an environmental control setting for the second zone; and
  if it is determined that the user has selected the first option, sending, to a first thermostat operable to control an environmental parameter of the first zone, a message comprising the command to alter the environmental control setting for the first zone; and
  if it is determined that the user has selected the second option, sending, to a second thermostat operable to control an environmental parameter of the second zone, a message comprising the command to alter the environmental control setting for the second zone.

16. A method according to claim 14, further comprising:
sending a single message to the environmental control system to alter the environmental control setting for the first zone and for the second zone, wherein the environmental control system comprises a hub at the premises, and wherein the method further comprises:
  sending, by the hub, a message to a first thermostat operable to control an environmental parameter of the first zone comprising a command to alter the environmental control setting for the first zone; and
  sending, by the hub, a message to a second thermostat operable to control an environmental parameter of the second zone comprising a command to alter the environmental control setting for the second zone.

17. A method according to claim 1, wherein the premises comprises at least a first zone and a second zone, each zone being independently controllable by the environmental control system; and wherein the step of determining that an environmental parameter of the premises satisfies a condition comprises:
  determining that an environmental parameter of the first zone and an environmental parameter of the second zone satisfy a condition; and
  wherein the command effecting control of at least one appliance comprises a command to alter an environmental control setting for the first zone and for the second zone.

18. A mobile device for controlling an environmental control system including at least one appliance for influencing one or more environmental parameters at a premises, the mobile device comprising:
  a wireless communications interface operable to receive information indicative of the location of the mobile device and to send and receive messages to and from the environmental control system;
  a screen for displaying information to a user;
  a memory storing an application for sending commands to the environmental control system, the application having at least:
    a foreground state for controlling the environmental control system based on a plurality of user-adjustable parameters for the one or more environmental parameters, wherein the application is arranged, using a screen of the mobile device to interact with a user, to present the user with an option to adjust one or more of the user-adjustable parameters in the foreground state; and
    at least one background state, wherein the application is arranged to generate user notifications in the background state; and
  a processor operable to:
    determine that the mobile device has crossed a predetermined geolocation threshold;
    receive an indication that an environmental parameter of the premises satisfies a condition;
    display, on the screen of the mobile device, a notification to a user, the notification comprising an option to initiate a command effecting control of at least one appliance;
    detect that the user has selected the option to initiate the command; and
    send to the environmental control system a message to effect the command;
    wherein the command effecting control of at least one appliance is selected from a plurality of commands and the processor is further operable to rank the plurality of commands into a prioritised list according to at least one criterion.

19. A method of controlling, from a mobile device, an environmental control system including at least one appliance for influencing one or more environmental parameters at a premises; wherein the mobile device comprises an application for sending commands to the environmental control system, the application having at least:
  a foreground state for controlling the environmental control system based on a plurality of user-adjustable parameters for the one or more environmental parameters, wherein the application is arranged, using a screen of the mobile device to interact with a user, to present the user with an option to adjust one or more of the user-adjustable parameters in the foreground state; and
  at least one background state, wherein the application is arranged to generate user notifications in the background state;
wherein the premises comprises at least a first zone and a second zone, each zone being independently controllable by the environmental control system;
the method comprising the steps of, when the application is in a background state:
  determining that the mobile device has crossed a predetermined geolocation threshold;
  determining whether an environmental parameter of the first zone satisfies a first condition;
  determining whether an environmental parameter of the second zone satisfies a second condition associated with the second zone, wherein the first condition is settable independently from the second condition;
  displaying, on a screen of the mobile device, a notification to a user, the notification comprising an option to initiate a command effecting control of at least one appliance, wherein the notification comprises:
- if the environmental parameter of the first zone satisfies the first condition, a first option to initiate a command to alter an environmental control setting for the first zone; and
- if the environmental parameter of the second zone satisfies the second condition, a second option to initiate a command to alter an environmental control setting for the second zone;

detecting that the user has selected at least one of the first option and the second option;

if it is determined that the user has selected the first option, sending, to a first thermostat operable to control an environmental parameter of the first zone, a message comprising the command to alter the environmental control setting for the first zone; and if it is determined that the user has selected the second option, sending, to a second thermostat operable to control an environmental parameter of the second zone, a message comprising the command to alter the environmental control setting for the second zone.

20. A method of controlling, from a mobile device, an environmental control system including at least one appliance for influencing one or more environmental parameters at a premises; wherein the mobile device comprises an application for sending commands to the environmental control system, the application having at least:
- a foreground state for controlling the environmental control system based on a plurality of user-adjustable parameters for the one or more environmental parameters, wherein the application is arranged, using a screen of the mobile device to interact with a user, to present the user with an option to adjust one or more of the user-adjustable parameters in the foreground state; and
- at least one background state, wherein the application is arranged to generate user notifications in the background state;

wherein the premises comprises at least a first zone and a second zone, each zone being independently controllable by the environmental control system, and wherein the environmental control system comprises a hub at the premises;

the method comprising the steps of, when the application is in a background state:
- determining that the mobile device has crossed a predetermined geolocation threshold;
- determining that an environmental parameter of the premises satisfies a condition, comprising determining that an environmental parameter of at least one of the zones satisfies a condition;
- displaying, on a screen of the mobile device, a notification to a user, the notification comprising an option to initiate a command effecting control of at least one appliance, wherein the command comprises a command to alter an environmental control setting for the at least one of the zones;
- detecting that the user has selected the option to initiate the command;
- sending a single message to the environmental control system to alter the environmental control setting for the first zone and for the second zone;
- sending, by the hub, a message to a first thermostat operable to control an environmental parameter of the first zone comprising a command to alter the environmental control setting for the first zone; and
- sending, by the hub, a message to a second thermostat operable to control an environmental parameter of the second zone comprising a command to alter the environmental control setting for the second zone.

* * * * *